United States Patent
Fabbri et al.

(10) Patent No.: US 8,454,212 B2
(45) Date of Patent: Jun. 4, 2013

(54) ANTI-COLLISION LIGHT FOR AIRCRAFT

(75) Inventors: Francesco Fabbri, Montevarchi (IT); Paolo Vanni, Montevarchi (IT)

(73) Assignee: Sirio Panel S.p.A., Montevarchi (IT)

( * ) Notice: Subject to any disclaimer, the term of this patent is extended or adjusted under 35 U.S.C. 154(b) by 253 days.

(21) Appl. No.: 12/811,087

(22) PCT Filed: Dec. 28, 2007

(86) PCT No.: PCT/IT2007/000924
§ 371 (c)(1), (2), (4) Date: Oct. 4, 2010

(87) PCT Pub. No.: WO2009/084049
PCT Pub. Date: Jul. 9, 2009

(65) Prior Publication Data
US 2011/0018439 A1    Jan. 27, 2011

(51) Int. Cl.
*B64F 1/20* (2006.01)
(52) U.S. Cl.
USPC ............ 362/470; 340/981; 362/346; 362/542
(58) Field of Classification Search
USPC ............... 362/227, 231, 235–237, 249.01, 362/249.02, 249.06, 249.11, 297, 341, 346, 362/470, 477, 479, 493, 542–545, 800, 240–247; 340/815.45, 903, 961, 321, 815.73, 340/815.75, 981–983; 315/241 S
See application file for complete search history.

(56) References Cited

U.S. PATENT DOCUMENTS

| | | | | |
|---|---|---|---|---|
| 5,642,933 A * | 7/1997 | Hitora | | 362/243 |
| 6,183,100 B1 | 2/2001 | Suckow et al. | | |
| 6,364,506 B1 * | 4/2002 | Gallo | | 362/245 |
| 6,464,373 B1 * | 10/2002 | Petrick | | 362/235 |
| 6,595,667 B1 * | 7/2003 | Obata | | 362/489 |
| 6,679,618 B1 * | 1/2004 | Suckow et al. | | 362/247 |
| 6,682,211 B2 * | 1/2004 | English et al. | | 362/545 |
| 7,079,041 B2 * | 7/2006 | Fredericks et al. | | 340/815.45 |
| 7,236,105 B2 * | 6/2007 | Brenner et al. | | 340/981 |
| 7,568,821 B2 * | 8/2009 | Peck et al. | | 362/341 |
| 7,572,030 B2 * | 8/2009 | Booth et al. | | 362/245 |

(Continued)

FOREIGN PATENT DOCUMENTS

EP    1 731 423    12/2006

OTHER PUBLICATIONS

PCT International Search Report for PCT Counterpart Application No. PCT/IT2007/000924 containing Communication relating to the Results of the Partial International Search Report, 4 pgs., (Aug. 27, 2008).

(Continued)

*Primary Examiner* — Hargobind S Sawhney
(74) *Attorney, Agent, or Firm* — Blakely, Sokoloff, Taylor & Zafman LLP

(57) ABSTRACT

An anti-collision light for aircraft comprising two illuminating modules each comprising a number of LEDs disposed along a ring and coplanar to a plane, a first reflector facing the LEDS and a second reflector surrounding the LEDS; the first and the second reflector are so configured as to reflect the light emitted by LEDs toward angles between 0 and 75° above or below said plane. An additional module providing infra-red radiation is may be provided; the additional module comprising number of infra red LEDs disposed along a ring and coplanar to a plane and a reflector facing the infra red LEDs.

15 Claims, 3 Drawing Sheets

U.S. PATENT DOCUMENTS

| | | | |
|---|---|---|---|
| 8,033,683 B2 * | 10/2011 | Fields | 362/231 |
| 8,096,677 B2 * | 1/2012 | Fields et al. | 362/231 |
| 2004/0130900 A1 | 7/2004 | Ganzer et al. | |
| 2005/0083699 A1 | 4/2005 | Rhoads et al. | |
| 2006/0007012 A1 | 1/2006 | Machi et al. | |
| 2006/0077071 A1 | 4/2006 | Brenner et al. | |
| 2007/0002572 A1 * | 1/2007 | Ewig et al. | 362/470 |
| 2010/0027281 A1 * | 2/2010 | Waters et al. | 362/470 |

OTHER PUBLICATIONS

PCT Written Opinion of the International Search Authority for PCT Counterpart Application No. PCT/IT2007/000924, 5 pgs., (Aug. 27, 2008).

* cited by examiner

ANTI-COLLISION LIGHT FOR AIRCRAFT

CROSS-REFERENCE TO RELATED APPLICATION

This patent application is a U.S. National Phase application under 35 U.S.C. §371 of International Application No. PCT/IT2007/000924, filed on Dec. 28, 2007, entitled ANTI-COLLISION LIGHT FOR AIRCRAFT.

FIELD OF THE INVENTION

The present invention relates to an anti-collision light for aircraft.

BACKGROUND OF THE INVENTION

Many aircrafts mount two anti-collision lights, one light placed on the upper part of the fuselage and the other disposed on the bottom part of the fuselage to illuminate with the first one the upper hemisphere and with the second one the bottom hemisphere.

Usually, the upper anti-collision light covers the angle from 0° to +75° (with respect to an horizontal plane) whereas the bottom anti-collision light covers the angle from 0° to −75° (the field of coverage of the anti-collision lights is stated in FAR25-CS25/FAR23-CS23 par. 1401b).

Moreover, the anti-collision light is configured to flash in use (flashing characteristics of an aircraft anti-collision light are stated in FAR25-CS25/FAR23-CS23 par. 1401c).

LED light sources are particularly suitable for anti-collision aircraft lights since they allow for minimization of power consumption, have low failure rates and low cost, present a small volume and a reduced weight.

US2006007012 describes rotationally symmetrical anti-collision light for an aircraft utilizing light-emitting diodes (LEDs) configured in one or more concentric rings.

The anti-collision light includes reflector configured to redirect the light emitted by at least one of the rings, so that the light pattern satisfies predetermined specifications.

US2006077071 describes an anti collision light for aircraft including a number of light emitting diodes (LEDs) arranged on a common plane. A reflecting arrangement is located above the plane and reflects the light emitted by the diodes in a sideward direction. A surrounding reflecting arrangement can be provided around the diodes and an additional reflecting arrangement in form of a layer on the plane may also be utilized.

US2004130900 describes an anti-collision light for aircraft provided with a holding body with an outer side and several LEDs arranged at the outer side of the holding body the light-radiating directions of which point away from the holding body. The anti-collision light is provided with a refractive optical element for generating a desired spatial distribution of the light of the LEDs; the refractive optical element surrounding the holding body at least in the region of the LEDs.

OBJECT AND SUMMARY OF THE INVENTION

The aim of the present invention is to provide an anti-collision light for aircraft utilizing led sources and having optical characteristics complying with existing directive present in the field, particularly FAR25-CS25/FAR23-CS23 par. 1401b.

The above scope is obtained by the present invention that relates to an anti-collision light as defined in claim 1.

BRIEF DESCRIPTION OF THE DRAWINGS

The invention shall be described with respect to the enclosed drawings that represent a not-limiting example of the invention wherein.

DETAILED DESCRIPTION OF PREFERRED EMBODIMENTS OF THE INVENTION

Figure 1:
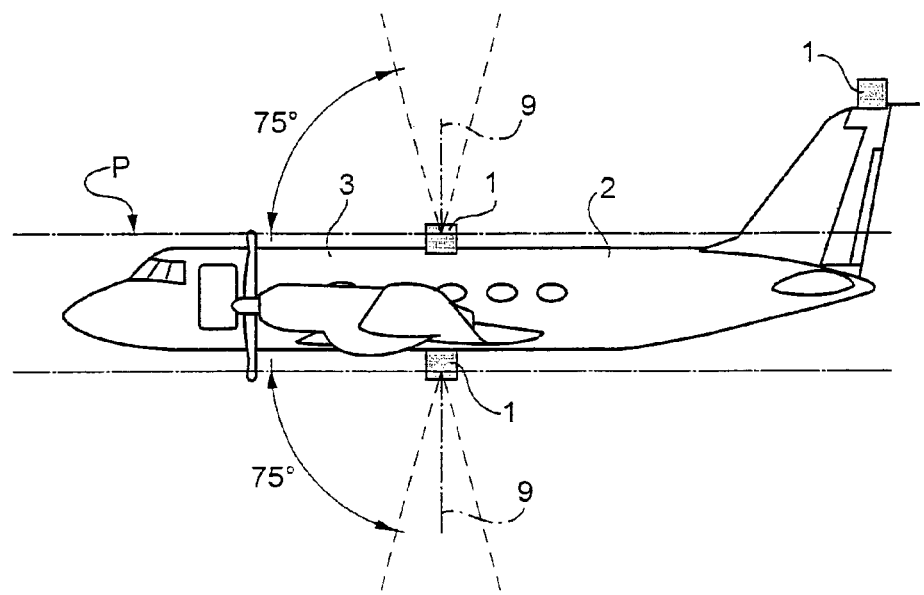
FIG. 1 shows an example of the disposition of the anti-collision light on an aircraft.

In FIG. 1 it is shown the use of the anti-collision light 1 on an aircraft 2 (shown schematically).

The anti-collision light 1 may be placed, for instance, on the upper part of the fuselage 3 and/or one on the bottom part of the fuselage 3 of the aircraft 2 (the second anti-collision light is conveniently mounted revolved with respect to the first one) to illuminate with the first one the upper hemisphere and with the second one the bottom hemisphere.

The upper anti-collision light 1 covers the angles from 0° to +75° with respect to an horizontal plane P whereas the bottom anti-collision light 1 covers the angles from 0° to −75° with respect to an horizontal plane P thus meeting requirements stated in FAR25-CS25/FAR23-CS23 par. 1401e and 1401f.

Figure 2:
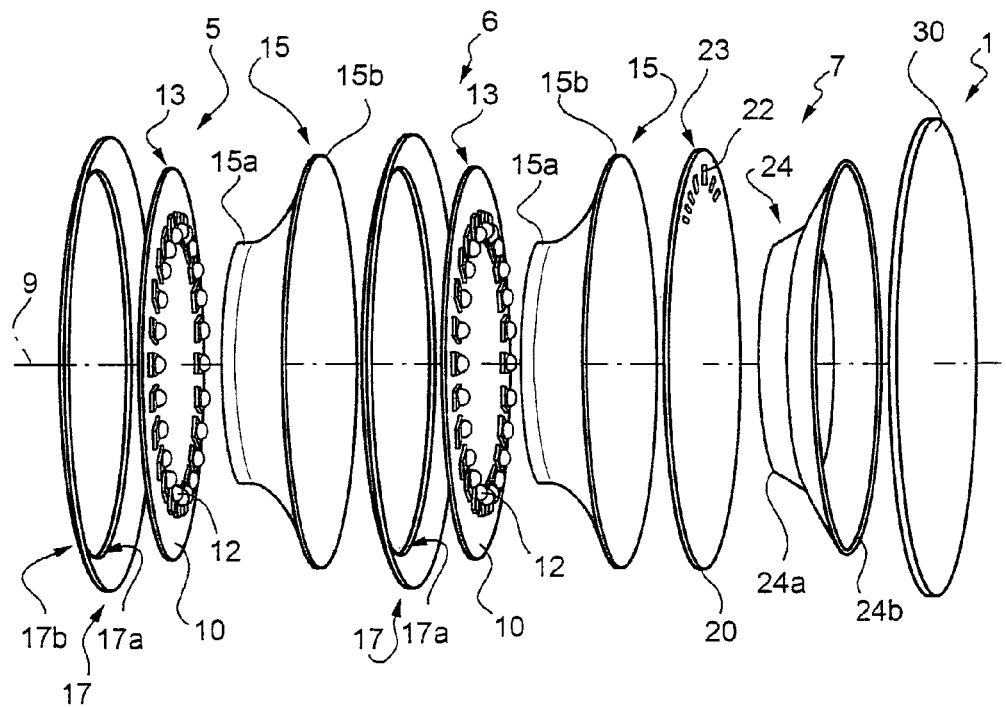
FIG. 2 shows, in a perspective exploded view, an anti-collision light realized according to the present invention.
Figure 3:
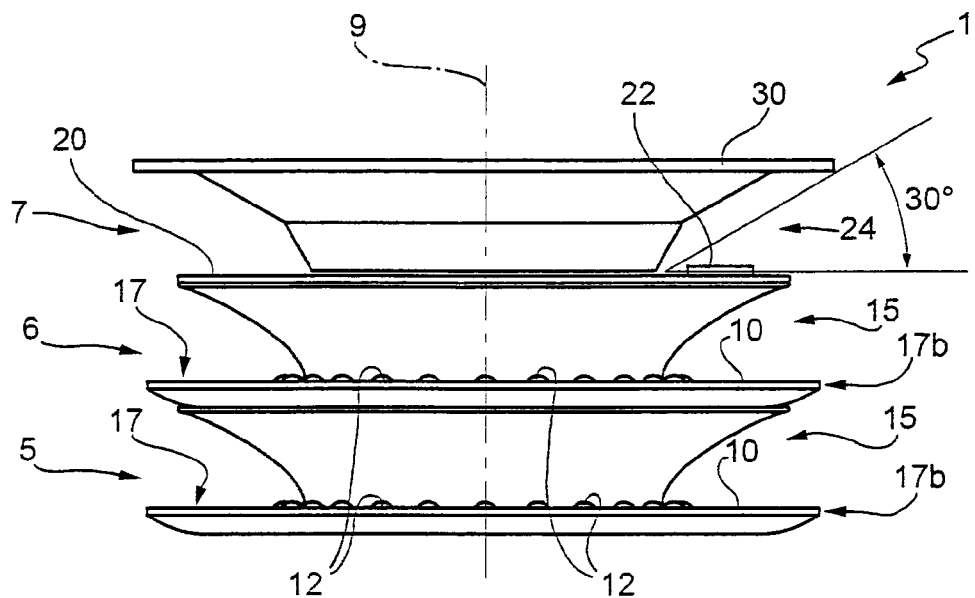
FIG. 3 shows by means of a lateral view, the anti-collision light realized according to the present invention.
Figure 4:
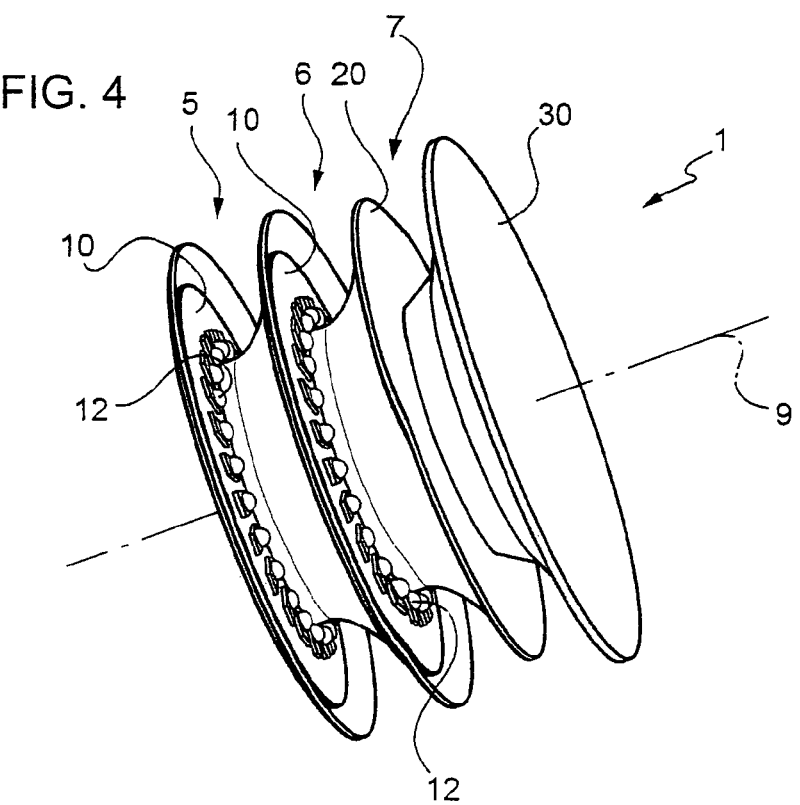
FIG. 4 is a perspective view of the anti-collision light realized according to the present invention.

With respect to FIGS. 2, 3 and 4 the anti-collision light 1 comprises three modules 5, 6 and 7 having axial symmetry around a common axis 9 and disposed one above the other along axis 9.

More particularly, the first and second module 5 and 6 are identical in the example and adjacent one with respect the other along axis 9 while third module 7 is disposed at one side of second module 6.

The goal of first and second module 5 and 6 is to perform the visible illumination of the anti-collision light 1; the third module 7 is optional and has the goal to perform an Infra Red illumination in the case that aircraft 2 needs to fly in covert/IR mode.

In use, axis 9 is placed perpendicular to the horizontal plane P of the aircraft 2.

Each first/second module 5 and 6 comprises:

a planar circuit board 10 having circular shape with radius R, perpendicular and symmetric with respect to axis 9 and carrying a plurality of LEDs 12 (for instance twenty-four LEDs) disposed on board 10 along an internal ring with radius r (with R>r)—accordingly LEDs 12 are radially spaced with respect to the rims 13 of circular board 10;

a first reflector 15 with parabolic section and cylindrical symmetry around axis 9 having a first smaller end portion 15a with radius r1 (r1<r) disposed in contact with board 10 and a second larger end portion 15b (having radius close to radius R) spaced from board 10—the reflector 15 faces LEDs 12; and a second ring shaped reflector 17 surrounding circuit board 10 and LEDs 12; the second reflector 17 has an internal rim portion 17a surrounding the rims 13 of circuit board 10 and an external rim portion 17b laying in a plane different from the plane of the internal rim portion 17a. The second reflector 17 is placed around the visible LEDs 12 rings and has a cylindrical symmetry around axis 9.

Thus, the LEDs 12 of the first illuminating module 5 and of the second illuminating module 6 lay in parallel planes (see FIG. 2) both perpendicular to axis 9.

The first reflector 15 redirects the light produced by LEDs 12 essentially from 0° to 20° above the plane of the LED ring (i.e. the plane of board 10 corresponding, in use, with plane P) in order to meet the requirement of high intensity between 0° and 20° as stated in FAR25-CS25/FAR23-CS23 par. 1401e and 1401f.

The second reflector 17 redirects the LED light essentially towards angles larger than 20° up to at least an angle of 75° with respect to the plane of LEDs in order to meet the requirement of intensity stated in FAR25-CS25/FAR23-CS23 par. 1401e and 1401f. Part of the LED light is not redirected by reflectors 15, 17 but contributes directly to the total intensity of the aircraft anti-collision light 1 in order to meet the requirement of intensity stated in FAR25-CS25/FAR23-CS23 par. 1401e and 1401f.

Colour of the light emitted by the LEDs 12 of respective modules 5 and 6 may be aviation white or aviation red (defined in FAR25-CS25/FAR23-CS23 par. 1397).

More particularly, LEDs 12 of modules 5 and 6 may be white/red high power LEDs (for instance LEDs with efficiency >50 lm/W and driven up to 1 A current) that meet aviation colour requirement stated in FAR25-CS25/FAR23-CS23 par. 1397.

In the aircraft anti collision light 1 above described, modules 5 and 6 have identical structure and the same dimensions; however it is clear that modules 5 and 6 may have different structure and different dimensions whenever working in the same way as here described.

The third module 7 is basically composed by three parts:

a planar circuit board 20 having circular shape (with radius R) perpendicular and symmetric with respect to axis 9 and carrying a plurality of LEDs 22 disposed on board 20 along an internal ring with radius r (with R>r)—accordingly LEDs 22 are radially spaced with respect to the rims 23 of circular board 20;

a reflector 24 with an approximately troncoconic shape around axis 9 having a first smaller end portion 24a with radius r1 (r1<r) disposed in contact with board 20 and a second larger end portion 24b (having radius close to radius R) spaced from board 20; and a plane circular masking plate 30 perpendicular and symmetric with respect to axis 9 placed in contact with the larger end portion 24b of reflector 24.

The reflector 24 is thus placed above the IR LEDs 22 rings and redirects the LED light essentially from 0° to 30° (according SAE ARP5825 par. 3.3.2.1) above the plane 20 of the IR LED ring (i.e. the plane of board 20 corresponding, in use, with plane P—see FIG. 3) in order to meet the requirement of SAE ARP4392 par. 3.2.5.3 lights (minimum NVIS radiant intensity emission of the anti-collision light in covert mode is 0.2 NRI.

Masking plate 30 limits the emission of LEDS 22 to angles less than 30° above and below the plane defined by horizontal board 20 since the covert/IR light(s) shall not be viewable from the lower hemisphere according to MIL-STD-3009 par. 4.5.1 and 5.8.1. 1).

LEDs 22 emit near infrared radiation (wavelength larger than 780 nm but shorter than 930 nm) in order to allow the pilots for the NVG (Night Vision Goggle) flight.

For instance, in the exemplary structure shown in FIG. 2, the number of IR LEDs 22 is forty-two and the LEDs 22 have an efficiency of around 30 mW when driven at 100 mA (maximum driving current is 400 mA) and have peak wavelength of 850 nm.

The third module 7 meets requirements stated in SAE ARP4392 par. 3.2.5.3, concerning NVIS radiant intensity emission of covert/IR anti-collision lights (minimum NVIS radiant intensity emission of the anti-collision light in covert mode is 0.2 NRI), and SAE ARP4392 par. 3.2.5.5, concerning covertness of anti-collision light (the maximum effective intensity of the source shall be lower than 1 cd at any distribution angle).

In certain cases, depending on the aircraft, the third IR module 7 works only for the anti-collision light 1 that will be installed on the top of the aircraft 2, since the IR light(s) shall not be viewable from the lower hemisphere according to MIL-STD-3009 par. 4.5.1; module 7 is designed in a way that the IR radiation will be masked from emit light in the lower hemisphere meeting requirement of MIL-STD-3009 par. 5.8.1. "Lower hemisphere" shall be defined as not directly viewable by an NVIS equipped ground or aerial observer when the system is directly overhead, straight and level, and 100 to 500 feet away.

In other cases module 7 will work in covert mode, according to SAE ARP5825 that states that the IR emission shall be 30° above and below the horizontal plane; however in these cases IR emission for angles larger than 30° below the horizontal plane of the aircraft shall be masked in order to meet requirements of MIL-STD-3009.

Module 7 when in covert/IR mode will work flashing according to requirement of MIL-STD-3009 par. 4.5.1 stating that "The IR ON mode shall have at least six pilot selectable flash patterns with varying flash durations and periods. One of these six patterns shall have an equal ON and OFF times. All six patterns shall be square wave in nature. All modes shall be pilot selectable."

A sensing circuit (not shown) may be provide to monitor efficiency of the LEDs 12, 22 and, in case the efficiency requirements are not met (for instance scarce intensity of the light provided), a feed-back circuit increases the current supplied to the LEDs 12, 22 to enhance light efficiency.

In case of partial/total failure of the LEDs a warning signal is sent to the user (by means of an output signal, or a particular flash pattern, or a light indicator, etc.).

Figure 5:
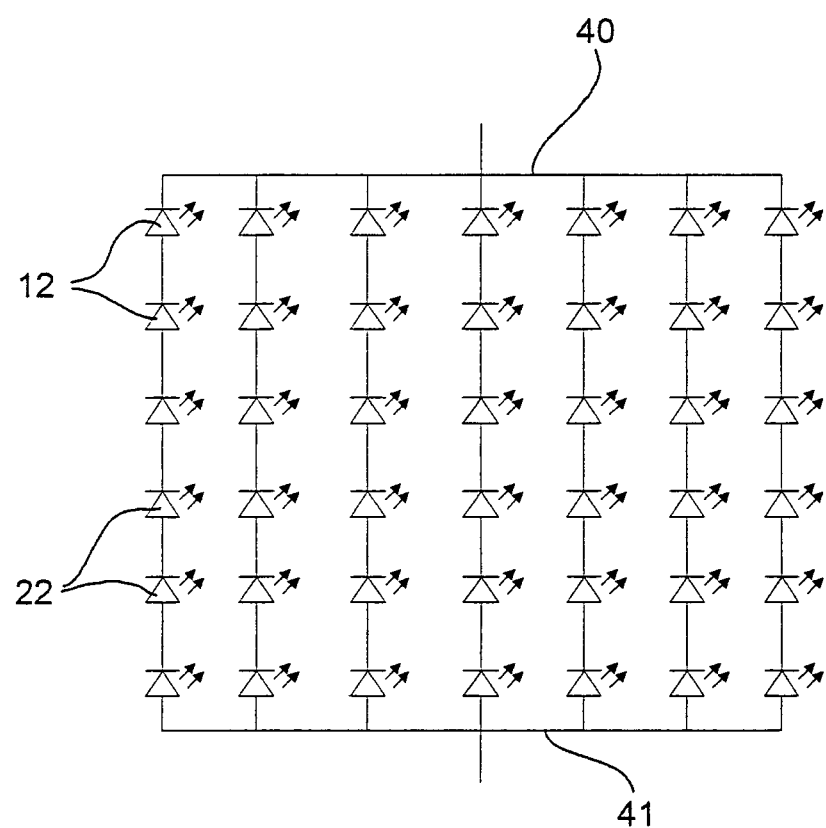
FIG. 5 is an electric circuit of a part of the anti-collision light realized according the present invention.

As shown in FIG. 5 LEDs 12, 22 may be connected as shown schematically i.e. comprising a number of lines where the LEDs are connected in series; the series of LEDs having end terminals connected with a first and a second supply line 40,41.

Of course the architectures shown in FIG. 5 is just an example about how the visible and IR LEDs 12, 22 can be arranged on the circuit board but other electrical arrangements can be adopted.

Finally, according to the MIL-STD-3009 par. 4.5.1, the anti-collision light 1 shall have four modes of operation:

OFF—modules 5, 6 and 7 in an OFF state;
ON—modules 5, 6 and 7 in an ON state;
IR ON (only)—only module 7 in ON state; and
infrared covert mode—module 7 in ON state and in a convert mode.

What is claimed is:

1. An anti-collision light for aircraft wherein least one illuminating module comprises a number of LEDs disposed along a ring and coplanar to a plane, a first reflector facing the LEDs and a second reflector surrounding the LEDS; the first and the second reflector being so configured as to reflect the light emitted by the LEDs toward angles between 0° and 75° above or below said plane.

2. The anti-collision light as defined in claim 1, comprising at least a first illuminating module and a second illuminating module disposed one to the side of the other.

3. The anti-collision light as defined in claim 2, wherein the LEDs of the first illuminating module and of the second illuminating module lay in parallel planes.

4. The anti-collision light as defined in claim 2, wherein said first illuminating module and said second illuminating module have respective LEDs emitting light with different colours.

5. The anti-collision light as defined in claim 2, wherein said first illuminating module and said second illuminating module have respective LEDs emitting red and white light.

6. The anti-collision light as defined in claim 1, wherein said first reflector has substantially parabolic section and cylindrical symmetry with respect to one axis with a larger end portion and a smaller end portion; said axis being perpendicular to said plane.

7. The anti-collision light as defined in claim 6, wherein said smaller end portion is close to said plane with respect to said larger end portion.

8. The anti-collision light as defined in claim 1, wherein said second reflector is annular with an inner rim substantially coplanar with said plane and an outer rim not coplanar with said plane.

9. The anti-collision light as defined in claim 1, wherein at least an additional module providing infra-red radiation is provided; said additional module comprising number of infra red LEDs disposed along a ring and coplanar to a plane and a reflector facing the infra red LEDS.

10. The anti-collision light as defined in claim 9, wherein said reflector has a semi-conical shape with respect to an axis with a larger end portion and a smaller end portion; said axis being perpendicular to said plane.

11. The anti-collision light as defined in claim 10, wherein said smaller end portion is close to said plane with respect to said larger end portion.

12. The anti-collision light as defined in claim 10, wherein a masking plate is placed adjacent to one end portion of said reflector.

13. The anti-collision light as defined in claim 9, wherein the reflector is so shaped as to reflect the light emitted by said infra-red LEDs towards angles between 0° and 30° above said plane.

14. The anti-collision light as defined in claim 1, wherein a sensing circuit is provided to monitor efficiency of the LEDs and, in case the efficiency requirements are not met, said sensing circuit control the current supplied to the LEDs to increase light efficiency.

15. The anti-collision light as defined in claim 1, wherein said LEDs are disposed with a number of lines where the LEDs are connected in series; the series of LEDs having end terminals connected with a first and a second supply line.

* * * * *